Figure 1:
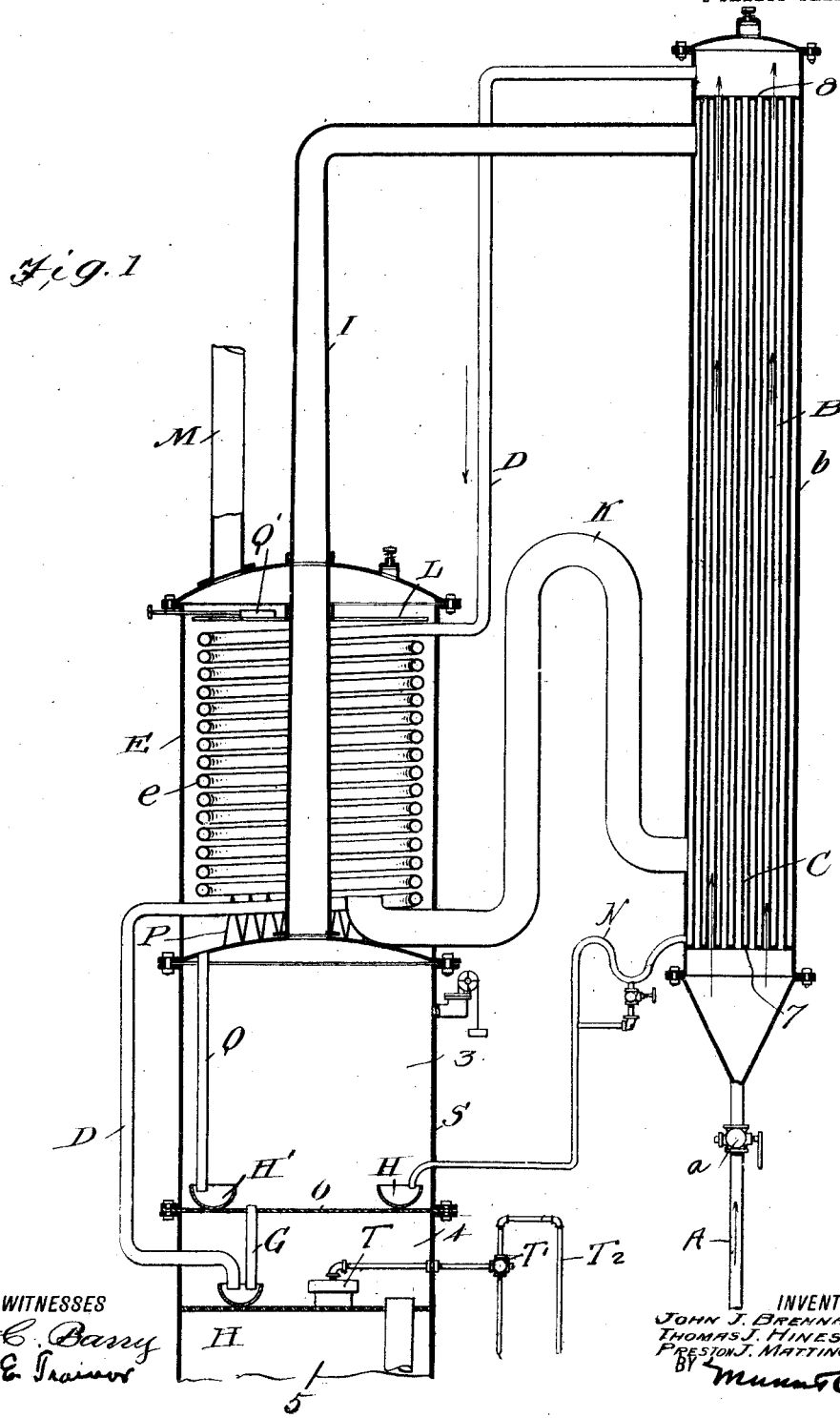

P. J. MATTINGLY, T. J. HINES & J. J. BRENNAN.
APPARATUS FOR DISTILLATION.
APPLICATION FILED AUG. 14, 1911.

1,034,267.

Patented July 30, 1912.
2 SHEETS—SHEET 1.

WITNESSES

INVENTORS
JOHN J. BRENNAN
THOMAS J. HINES
PRESTON J. MATTINGLY

ATTORNEYS

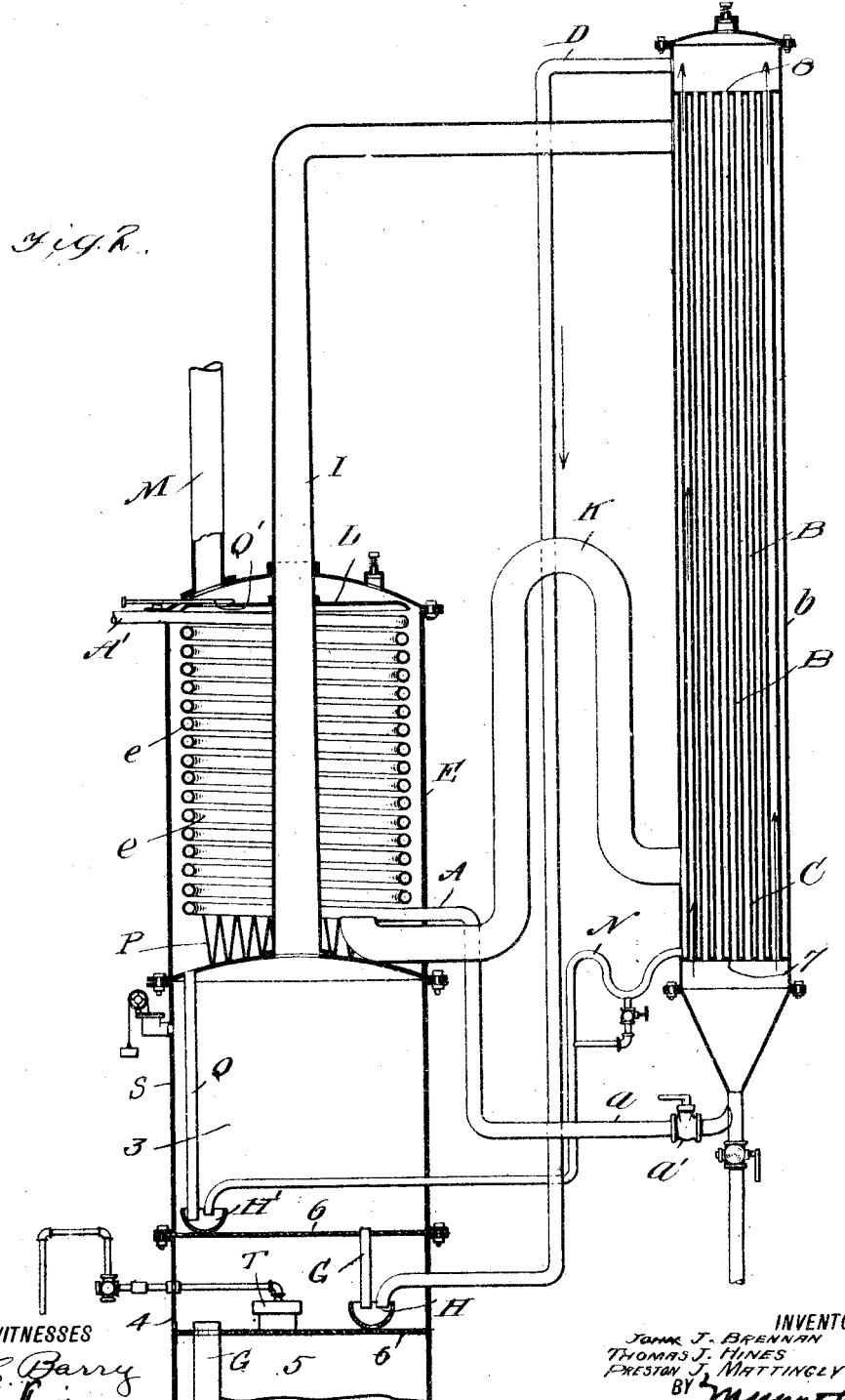

UNITED STATES PATENT OFFICE.

PRESTON J. MATTINGLY, THOMAS J. HINES, AND JOHN J. BRENNAN, OF LOUISVILLE, KENTUCKY.

APPARATUS FOR DISTILLATION.

Specification of Letters Patent. Patented July 30, 1912.

Application filed August 14, 1911. Serial No. 643,818.

*To all whom it may concern:*

Be it known that we, PRESTON J. MATTINGLY, THOMAS J. HINES, and JOHN J. BRENNAN, citizens of the United States, residing in the city of Louisville, county of Jefferson, and State of Kentucky, have invented certain new and useful Improvements in Apparatus for Distillation, of which the following is a specification.

Our invention has for its object to procure a more refined distillate by removing from the product all congeners which are of low grade and which are volatile only at higher temperatures, thereby producing a more refined product.

A further object is to procure a more refined distillate by removing from the products all congeners which are of low grade and which are volatile only at high temperatures, thereby producing a more refined product and one in which precipitates will be formed in a less degree by a reduction of proof than in distillates made by present methods.

A further object is to provide a still which will require fewer heat units for the production of a fixed amount of distillate as compared with devices at present in use, and wherein there will be produced a greater number of proof gallons from the same quantity of mash than is obtained by the present methods.

A further object is to provide means to prevent boiling over or spewing of solids from the still into the finished product.

The invention consists in the parts and combinations thereof hereinafter set forth and claimed.

In order to make the invention more clearly understood, we have shown in the accompanying drawings means for carrying the same into practical effect, without limiting our improvements in their useful application to the particular construction shown.

In said drawing Figure 1 is a vertical sectional view of a distilling apparatus embodying our improvements; and, Fig. 2 is a similar view of a modified form.

Referring to the drawing, A is a pipe through which the beer or mash is conducted from the mash tubs, or other place where it is prepared into the pre-heater B which may be of any preferred construction. As illustrated, it is formed with a somewhat elongated cylindrical case $b$ into the lower end of which the beer or liquid to be distilled is forced or pumped from the pipe A, into the heater, the said pipe A being provided with a valve $a$ for controlling the flow of liquid.

The pre-heater is provided with longitudinal pipes C through which the liquid passes to the upper end of the pre-heater where it passes out through the pipe D. The main chamber $b$ of the heater surrounding the pipes C is heated by vapor from the still which enters by pipe I at the top of the heater. The chamber $b$ is inclosed at its ends by diaphragms 7 and 8 through which pipes C open.

S indicates the column of the still, which is divided into successive chambers 3, 4, 5, etc., by perforated diaphragms 6. The chamber 3 is connected with the chamber 4 for the downward passage of liquid by discharge pipe G which delivers the liquid into a hemispherical or other receiving overflow cup H. A similar connection is made from the chamber 4 to the chamber 5 and so on according to the number of successive chambers which the still contains. A known means for delivering steam or other heating fluid from the lower end of the column S will be employed, the illustration of such means not being necessary to the understanding of our invention.

Superimposed upon chamber 3 for convenience, but not limiting this invention to such location of said chamber is the chamber E, which for convenience will hereafter be called the differential chamber. In said chamber and close to the inner surface of same is a coil of pipe $e$ slanting downward and circling around and close to the inner surface of said differential chamber. The pipe D passing downward from the top of the pre-heater enters the differential chamber E and discharges into the coil of pipe $e$, said coil of pipe finally passing through the side of differential chamber near the bottom and down along the side of column S entering chamber 4 and discharging into the cup therein shown. The vapor rising out of said column passes through pipe I running for convenience in construction through differential chamber E, though our invention is not limited to that form of construction, passes up through pipe I into pre-heater B below the diaphragm 8, and is discharged into said pre-heater, around pipes C. In this pre-heater the vapor passing from the column through pipe I, heats the liquid rising through the pipes C and is more or less cooled thereby, and after being so cooled, passes through pipe K as indicated into the differential chamber E. Here by means of diaphragm L acting as a baffle, the vapors coming through pipe K are prevented from rising directly through the top of said differential chamber and are forced to pass out laterally between coils e coming in contact with these pipes containing the cooler fermented liquid from the heater B, and the substances in said vapor which are volatile only at higher temperatures are condensed by contact with pipes e and fall to the bottom of said differential chamber through pipe Q into overflow cup H', and thus on down through the various chambers of the column for redistillation, and the vapors which are volatile at lower temperatures pass out through pipe M to the condenser or other devices as a final product.

By bringing the vapors through pipe K into the differential chamber E and in contact with the coil pipes e all the products of distillation of a less refined character and all except those which are volatile at low temperatures are condensed and run back into the column S and only those vapors pass out through pipe M which are volatile at low temperatures and are of greater purity and refinement. The second method of construction is to provide for an even greater differential and greater condensation and elimination of low grade and less volatile congeners where such a result is desired.

In Fig. 2 of the drawing is shown the alternate construction above referred to by which a greater differential may be obtained, and a greater portion of congeners volatile only at high temperature eliminated from the finished product. In that method of construction, as stated, the beer or other liquid to be distilled enters the differential chamber E through pipe A' directly from the place where it is prepared and before passing through the pre-heater B. The liquid then passes by pipe A into and through the pre-heater B as in the other form, thence through pipe D into chamber 4 of the column of the still. This method differs from the first method described only in this, that in the first method the beer or other liquid to be distilled passes through the pre-heater B then through the differential coil E then into the column, whereas in the second method of construction the beer passes first through the differential coils E then through the pre-heater B and then into the column. By this method, the vapor coming through pipe K from the pre-heater B and passing through the differential chamber E strikes the coil of pipes e as in the other method of construction, but the liquid passing through pipes e having not yet passed through the pre-heater B are of a lower temperature than in the first method of construction, which we have invented, thereby an even greater amount of condensation takes place in the differential chamber E, and a greater proportion of the low grade congeners in the vapor produced by distillation in the column is condensed, and the finished product passing through pipe M is of an even greater refinement.

In both constructions, a means is provided for controlling the passage of the vapor from the differential chamber to the condenser, the said means consisting of an opening in the baffle plate L, and a valve Q' for controlling the said opening. By means of the said valve Q', as much or little of the vapor entering the differential chamber through pipe K can be permitted to escape through pipe M without passing between coils e, thus regulating the degree of refinement of the finished product passing through M. Any liquid of condensation in heater B is returned to the column through pipe N, and any liquid of condensation in the differential chamber E is returned to the column through pipe Q. To the bottom coil of differential pipes e are attached drip strips P to assist gravitation in carrying down the liquid of condensation to the diaphragm at the top of chamber 3, and thence through pipe Q into the column.

In the construction shown in Fig. 1, the liquid enters through the pipe A, passes into the pre-heater and through the pipes C to the upper end of the pre-heater, leaving the same through the pipe D, which opens into the coil e of the differential chamber. From the coil e the liquid passes into the column of the still. The products of distillation pass from the uppermost chamber of the column through the pipe I to the pre-heater, opening thereinto between the diaphragms 7 and 8, and passing from this portion of the pre-heater through the pipe K to the differential chamber, where the vapor comes into contact with the coil e, and finally leaves the said chamber through the pipe M.

In the construction of Fig. 2, the liquid to be distilled enters through the pipe A' into the coil e of the differential chamber, and passes through the said coil through the pipe a into the lower end of the pre-heater. The liquid then passes through the pipes C of the pre-heater to the upper end thereof, and through the pipe D to the column. The products of distillation pass from the column through the pipe I, after which their course is precisely the same as in the construction shown in Fig. 1.

In either case, the products of distillation pass from the column to the pre-heater where they are cooled by the contact of the cooler liquid contained in the pipes C, and afterward pass through the pipe K to the differential chamber where they are again cooled by coil e. That is, in both cases the products of distillation finally or ultimately pass through the differential chamber. It will be evident also that the cooling is furnished in both instances by the liquid to be distilled and that the pipe D leads from the pre-heater to the column, in one case having the coil e interposed therein, while in the other case the said pipe opens directly into the column.

A float valve T is arranged above the chamber 5 in both constructions, for controlling the supply of steam to the column of the still. The said valve is connected to a valve T' in the supply pipe T² which supplies steam to the still. When the beer rises a sufficient height above the said partition, the valve is operated to close or partially close the valve T', to diminish or cut off the supply of steam for heating the still to prevent spewing.

We claim:

1. In combination with the still and the pre-heater thereof, of a differential chamber superposed on the column of the still, and having a discharge pipe at its top leading to the condenser, the vapor discharge pipe from the still to the pre-heater passing through the chamber at approximately the center thereof, a vapor return pipe leading from the pre-heater and discharging into the differential chamber at the bottom thereof, a worm arranged in the chamber near the side wall thereof, and connected to the pre-heater for supplying the fermented mash or beer thereto, a baffle plate in the chamber above the worm, the edges of the plate being spaced apart from the walls of the chamber to form an annular passage, said plate having an opening, and a valve controlling the opening, said chamber having a free discharge at its lower end to the still to prevent the collection of the products of condensation and their subsequent redistillation in the chamber.

2. In combination with the still and the pre-heater thereof, of a differential chamber superposed on the column of the still, and having a discharge pipe at its top leading to the condenser, the vapor discharge pipe from the column to the pre-heater passing through the chamber, a vapor return pipe leading from the pre-heater and discharging into the differential chamber at the bottom thereof, a worm arranged in the chamber near the side walls thereof, and connected to the pre-heater for supplying the fermented mash or beer thereto, a baffle plate in the chamber above the worm, the edges of the plate being spaced apart from the walls of the chamber to form an annular passage, said chamber having a free discharge at its lower end to the still to prevent the collection of the products of condensation and their subsequent redistillation in the chamber.

3. In combination with the still and the pre-heater thereof, of a differential chamber superposed on the column of the still and having a discharge pipe at its top leading to the condenser, the vapor discharge pipe from the column to the pre-heater passing through the chamber, a vapor return pipe leading from the pre-heater and discharging into the differential chamber at the bottom thereof, a worm arranged in the chamber near the side wall thereof and connected to the pre-heater for supplying the fermented mash or beer thereto, means above the worm for controlling the passage of the vapors from the chamber, said chamber having a free discharge at its lower end to the still to prevent the collection of products of condensation and their subsequent redistillation in the chamber.

4. In combination with the still and the pre-heater thereof, of a differential chamber arranged adjacent to the still and provided with a discharge leading to the condenser, means for conducting the vapor from the pre heater to the chamber, a condenser arranged in the chamber, means above the condenser for regulating the passage of the vapors from the chamber, said chamber having a free discharge at its lower end to the still to prevent the collection of products of condensation and their subsequent redistillation in the chamber.

5. In combination with the still and the pre-heater thereof, of a differential chamber superposed on the column of the still, and having a discharge pipe at its top leading to the condenser, the vapor discharge pipe from the still to the pre-heater passing through the chamber, a vapor return pipe leading from the pre-heater and discharging into the differential chamber at the bottom thereof, a worm arranged in the chamber near the side wall thereof and connected to the pre-heater for supplying the fermented mash or beer thereto, a baffle plate in the chamber above the worm, the edges of the plate being spaced apart from the walls of the chamber to form an annular passage, said chamber having a free discharge at its lower end to the still to prevent the collection of the products of condensation and their subsequent redistillation in the chamber, means above the worm for controlling the discharge of the vapor from the chamber, the top of the still having an opening near the side wall of the chamber to permit the free discharge of the products of condensation from the chamber, and means for conducting the said products from the worm to the top of the still.

PRESTON J. MATTINGLY.
THOMAS J. HINES.
JOHN J. BRENNAN.

Witnesses:
JOSEPH SELLIGMAN,
L. A. FUSTING.